United States Patent [19]

Hoshino

[11] Patent Number: 4,485,421
[45] Date of Patent: Nov. 27, 1984

[54] COLORED FLOPPY DISKETTE

[75] Inventor: Takahiro Hoshino, Yokohama, Japan

[73] Assignee: Toyo Bussan Kabushiki Kaisha, Tokyo, Japan

[21] Appl. No.: 598,918

[22] Filed: Apr. 10, 1984

[51] Int. Cl.³ .................. G11B 23/02; B65D 85/30; B65D 85/57

[52] U.S. Cl. .................. 360/133; 206/309; 360/137

[58] Field of Search .......... 360/133, 137, 132, 128, 360/97-99; 206/309, 456; 270/1; 235/462

[56] References Cited

U.S. PATENT DOCUMENTS 3,504,907  4/1970  Barber ............................ 270/1
4,204,639  5/1980  Barber ............................ 235/462
4,223,361  9/1980  Zaitsu ............................ 360/133
4,251,843  2/1981  Masuyama ..................... 360/137
4,345,284  8/1982  Saito .............................. 360/132
4,428,483  1/1984  Narita ............................ 206/459

Primary Examiner—Robert Martin Kilgore
Attorney, Agent, or Firm—L. Lawton Rogers, III

[57] ABSTRACT

A colored diskette for holding a floppy disk with an outer colored substrate sheet forming an outer envelope, the inside of which is lined by a conductive layer acting as a shield and which is lined by a liner in which the disk rests. The data stored on the disk is color-coded so that the diskette may be easily stored and classified according to the color of the substrate.

1 Claim, 3 Drawing Figures

COLORED FLOPPY DISKETTE

BACKGROUND OF THE INVENTION

A conventional floppy diskette consists of a magnetic disk and a package in which the magnetic disk is sealed. The package P consists, as shown in FIG. 2, of a laminate composed of a sheet substrate 1 of vinyl chloride mixed with carbon, and a liner 2 of an unwoven cloth attached to one surface of the sheet substrate 1, and which is formed in the shape of a bag with the liner 2 on the inner side. The magnetic disk D is held between the adjacent surfaces of the liner 2.

The sheet substrate 1 is made, as mentioned above, of vinyl chloride in which carbon is mixed, so that the carbon can shield the magnetic disk D from the effects of static electricity, electromagnetic waves, and magnetic lines of force. The color of this package is thus limited to black.

However, the sheet substrate 1 used in practice has a low carbon content, so that the magnetic disk D is liable to be influenced by static electricity, electromagnetic waves, and magnetic lines of force, the influence thereof being particularly large in winter. It often happens that data magnetically stored on the magnetic disk D is disrupted by static electricity and electromagnetic waves so that it becomes unusable. It is also inevitable that the package can only be colored black, which is inconvenient when these floppy diskettes are used. The floppy diskettes used for office work should preferably be classified according to the type of office work. However, since the packages of conventional floppy diskettes can only be black, it is necessary to stick seals thereon. Therefore it is impossible to identify at a glance the class to which each floppy diskette belongs. The same applies to floppy diskettes for games.

Under these circumstances, if a floppy diskette of which package could be of any color is developed, it would be very convenient.

The present invention has been developed with this problem in mind, and provides a colored floppy diskette of which the package can have any selected color, but which still protects the magnetic disk from the effects of static electricity and electromagnetic waves.

DETAILED DESCRIPTION OF THE INVENTION

The present invention is directed to providing a colored floppy diskette consisting of a package made of a laminate composed of a sheet substrate of a synthetic resin of any desired color, a liner attached to one surface of the sheet substrate over a conductive fibrous layer, with a magnetic disk sealed into the package.

An embodiment of the present invention will now be described with reference to the drawings.

Figure 1:
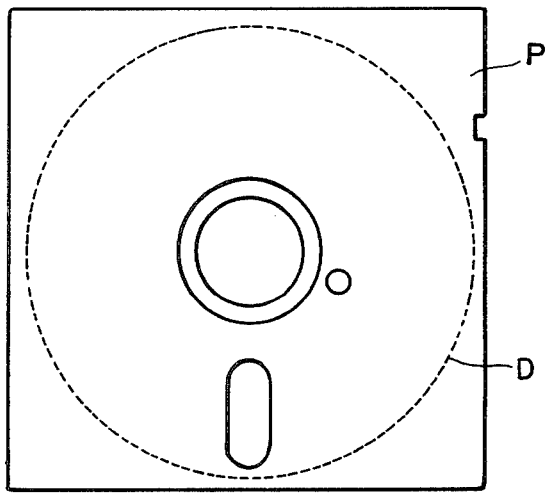
FIG. 1 is a front elevation of an embodiment of the colored floppy diskette according to the present invention.
Figure 2:
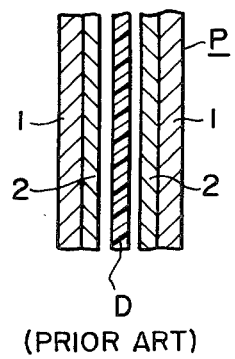
FIG. 2 is an enlarged section through a conventional floppy diskette.
Figure 3:
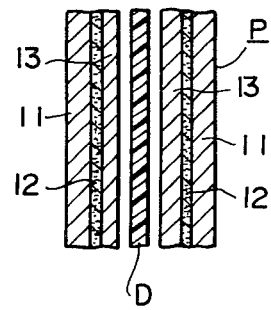
FIG. 3 is an enlarged section through the colored floppy diskette according to the present invention.

Referring to FIG. 3, reference numeral 11 denotes a sheet substrate consisting of a synthetic resin sheet of any desired color. A conductive fibrous layer 12 consisting of an unwoven cloth of conductive fibers is laminated onto one surface of the sheet substrate 1. A liner 13 consisting of an unwoven cloth of polyester fibers is then laminated onto the conductive fibrous layer 12. A package P is formed of this laminate with the liner 13 directed inward. A magnetic disk D is sealed into this package P to form an embodiment of the floppy diskette according to the present invention.

In this floppy diskette, the conductive fibrous layer 12 laminated onto one surface of the sheet substrate 11 in the package P prevents static electricity and electromagnetic waves penetrating from the other surface thereof, thereby preventing the magnetic disk D being adversely affected by them. Moreover, unlike a package of a conventional floppy diskette, the package P of the floppy diskette according to the present invention need not contain carbon in the sheet substrate 11 thereof. Accordingly, the substrate 11 can be of any desired color, and therefore if packages of different colors are prepared, magnetic disks used for different purposes can be stored in packages of different colors as appropriate, and so floppy diskettes used for office work or playing games can be color-coded in a convenient sequence, if an advertisement is printed on the package P, as required, the package can also function as an advertising medium.

The present invention thus consists of a package made of a laminate composed of a sheet substrate made of a synthetic resin sheet of any desired color, a liner attached to one surface of the sheet substrate over a conductive fibrous layer, and a magnetic disk sealed into the package. Therefore, the magnetic disk is not influenced by static electricity or electromagnetic waves, and if suitable colors are assigned selectively to the packages according to the purpose of the magnetic disks therein, the floppy diskettes can be color-coded and arranged in order easily, depending on the object of the data stored therein. Thus, the present invention is very useful in practice as a floppy diskette.

I claim:

1. A colored floppy diskette comprising a package consisting of a laminate composed of a sheet substrate made of a synthetic resin of any selected color and a liner attached to one surface of said sheet substrate with a conductive fibrous layer therebetween, and a magnetic disk sealed into said package.

* * * * *